Jan. 31, 1956  H. T. BOOTH  2,733,050
RESERVOIR FOR CONGEALABLE LIQUIDS
Filed April 22, 1953
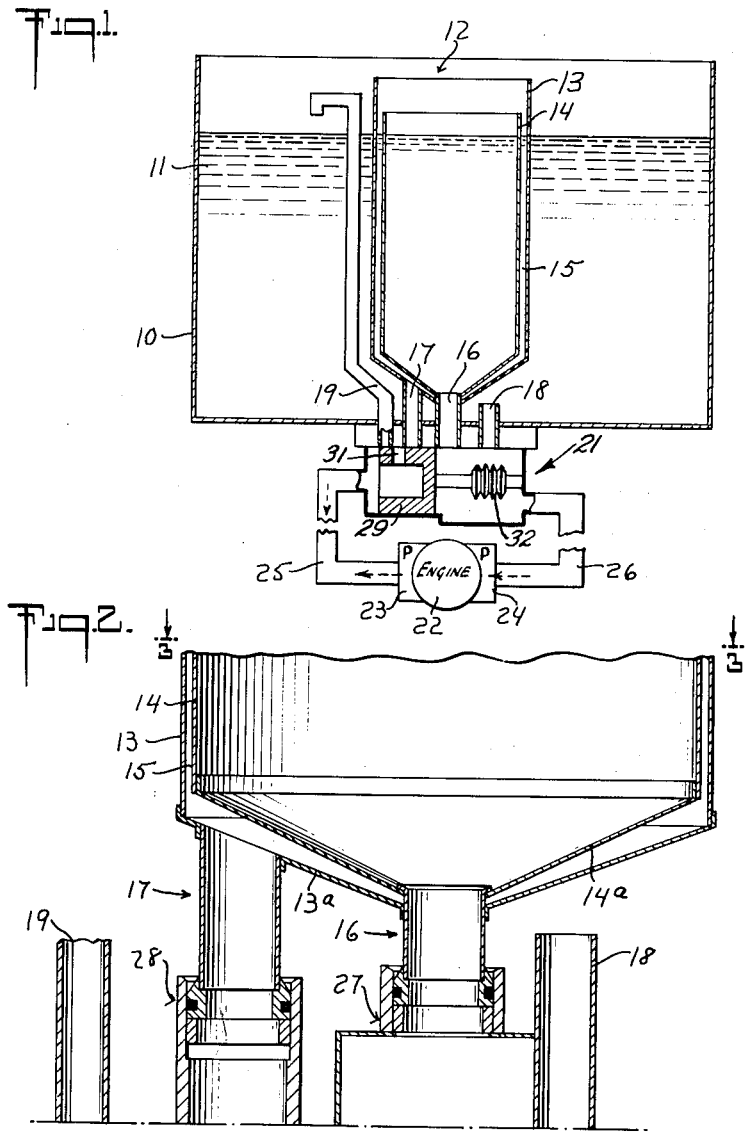
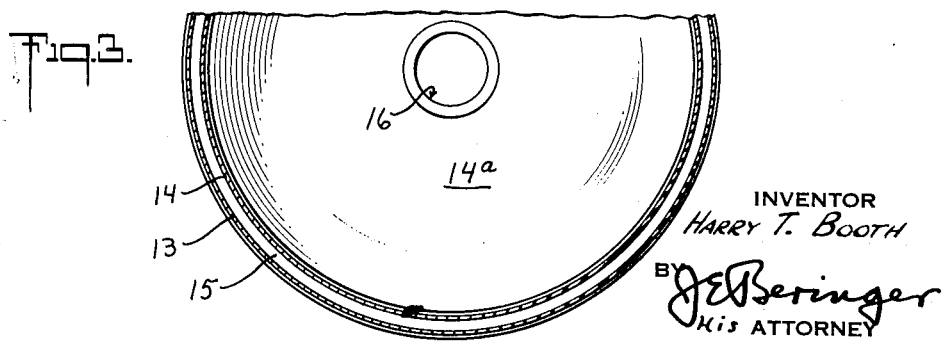
INVENTOR
HARRY T. BOOTH
BY J. E. Beringer
His ATTORNEY _United States Patent Office_

2,733,050
Patented Jan. 31, 1956

2,733,050
RESERVOIR FOR CONGEALABLE LIQUIDS

Harry T. Booth, Dayton, Ohio, assignor to United Aircraft Products, Inc., Dayton, Ohio, a corporation of Ohio Application April 22, 1953, Serial No. 350,295

12 Claims. (Cl. 257—195)

This invention relates to systems circulating a congealable liquid, and particularly to a reservoir for use therein.

While not so limited, the invention has particular reference to storage tanks used in the lubricant circulating systems of aircraft. Such tanks customarily include an inner hopper providing for a segregated flow of lubricant, as during the periods when a diluent is added to the system and during the warm up period of engine operation. Valve means, responsive to a changing condition of the lubricant, and possibly to other influences, is operable to shift the flow of oil returning from the engine from the hopper to the main portion of the tank and back again.

Advantage is taken of the location of the hopper in the tank to transfer some of the heat of the oil passing through the hopper during the warm up period to the oil standing in the tank. This is desirable in cold weather operation because the standing oil in the tank may be congealed or highly viscous. When the automatic valve controls shift flow from the hopper to the tank, it is necessary that the oil in the tank be fluid and flowable, or at least that a relatively large path through the tank be opened, else the volume of oil supplied the engine may be critically reduced.

In tank constructions as heretofore known, warming and decongealing of the oil in the tank by heat transfer through the wall of the hopper has been accomplished. Particularly under severe weather conditions, however, the process is a relatively slow one, requiring prolonged warm up before a suitable path is opened through the tank. The instant invention contemplates a more rapid conditioning of the oil in the engine, it being proposed to make more efficient use of available heat by directing the heated engine oil as a relatively high velocity film in heat exchange relation to the main body of stored lubricant prior to admitting it to the hopper.

Another object of the invention is to open a flow path through the stored, congealed lubricant in the same or less time heretofore known, using a smaller expanse of heat exchange area.

Still another object of the invention is to provide a hopper construction for oil tanks relatively cheap and easy to build and offering improved performance in the decongealing of stored lubricant in engine lubricant circulating systems.

Other objects and structural details of the invention will appear from the following description when read in connection with the accompanying drawing, wherein:

Fig. 1 is a diagrammatic view of parts of an engine lubricant circulating system, including a reservoir constructed in accordance with the illustrated embodiment of the invention;

Fig. 2 is a fragmentary view of a reservoir representing a structural embodiment of the reservoir of Fig. 1; and Fig. 3 is a fragmentary view in cross section taken substantially along the line 3—3 of Fig. 2.

Referring to the drawings, in the diagrammatic illustration of Fig. 1 a reservoir for lubricating oil is shown to comprise an outer shell 10 holding the main body 11 of stored lubricant. Received in the outer shell, in spaced relation to the walls thereof, is a hopper assembly 12 comprising nested, spaced apart members 13 and 14 defining therebetween an annular space 15.

The tops of the members 13 and 14 are open and lie normally above the level of the lubricant body 11, the member 13 being elongated to project in extended surrounding relation to the upper end of the member 14. The bottom of the member 14 communicates through a conductor means 16 with the exterior of the tank shell 10. Space 15, at the bottom thereof, communicates through a conductor means 17 with the exterior of the shell 10. The bottom of the shell 10, and the upper portion thereof above the level of body 11, are connected exteriorly by respective conductor means 18 and 19. The several means 16—19 are in side by side relation, projecting through the bottom wall of the shell 10, with the conductor means 19 rising through the liquid body 11 and disposed in adjacent parallel relation to the hopper assembly 12.

Flow through the conductor means 16—19 is controlled by a valve assembly 21 installed on or in connection with the shell 10 and in a lubricant circulating system which includes an engine 22, engine driven pumps 23 and 24 and flow lines 25 and 26. The valve assembly 21 may be of the kind disclosed in the pending application of W. H. Geddes, Serial No. 257,163, filed November 19, 1951, now Patent No. 2,725,069 dated November 29, 1955, for Oil Tank or Like Valve. It receives lubricant flowing from the engine by way of flow line 25, and, suitably operated and controlled, directs it either to the conductor means 17 or to the conductor means 19 or to both. Flow out of the hopper assembly is by way of conductor means 16 and flow out of the shell 10 is by way of conductor means 18, both flows being further through the assembly 21, with the lubricant returning to the engine by way of line 26.

In a typical operation of the system, a cold engine start will find the main body 11 of lubricant viscous and flow resistant, perhaps congealed. The flow circuit, under control of the valve assembly 21 which responds to one or more changing conditions of the lubricant, then is from the engine 22 to valve assembly 21 by way of line 25 and thence to the hopper assembly 12 by way of conductor means 17. Entering space 15, between the hopper members 13 and 14, the flowing lubricant rises in such space until it reaches the upper end of member 14 where it spills over into such member. The lubricant descends through the member 14 and passes out of the hopper by way of conductor means 16, being then directed by valve assembly 21 through line 26 back to the engine.

The lubricant is heated by its passage through the engine, and, in passing through the flow passage represented by space 15 transfers such heat or a part thereof through the wall of member 13 to the lubricant in the main body of lubricant lying in adjacent surrounding relation to the hopper assembly. As a result such lubricant is reduced to a more flowable condition, with continued operation of the engine increasing the radial area of decongealment in the main body of the lubricant. Flow is in this manner maintained through the short circuit path defined by the hopper assembly 12 until the changing temperature-viscosity conditions of the flowing lubricant are effective through valve 21 to shift incoming flow from conductor means 17 to means 19. The further supply of lubricant to the engine is then from the main body 11 and it will be understood that since a flow path through such body has already been opened by heat transfer through the member 13, the free circulation of lubricant through the reservoir will continue, although now by way of inlet conductor means 19 and outlet conductor means 18.

As before noted, the conductor means 19 rises as a stand pipe along side hopper assembly 12, such location contributing to the maintaining of a freely open path therethrough. The position of the stand pipe means 19 and the extent of physical attachment to the hopper are predetermined in such wise that the thawing out of congealed oil in the means 19 be made dependent upon and subsequent to the conditioning of the lubricant in the tank around the pipe means.

In the structural example of Figs. 2 and 3, the members 13 and 14 are rolled sheet metal tubular elements with detachable conical bottom portions 13a and 14a respectively. The conductor means 16 and 17 are connected to the exterior of the tank shell by way of adapter housings 27 and 28. The tubular members 13 and 14 are in concentric relation so that the flow space 15 is annular in form. Further, the spacing between the members 13 and 14 is predetermined to produce a flow space 15 in which the velocity of lubricant flow is that most effective for each installation, having regard to the rate of lubricant flow in the circuit, expected temperatures values and size of the lubricant reservoir.

The arrangement is such as to provide for the moving of a relatively thin film of hot lubricant in heat exchange relation to the main body of stored lubricant, with full use being made of the available heat in substantially all of the lubricant returning from the engine. Moreover, such film or sheet of hot lubricant is effective on a large expanse of heat exchange area and it may be noted that the area nearest the outlet connection 18 is the first to receive the heated returning lubricant. Further, although the expense of heat exchange area is large, it has been found possible through application of the principles of the present invention to open a flow path through the main body of lubricant in the same or shorter length of time than was heretofore possible with a much larger heat exchange area.

Still further, although the hopper assembly 12 physically comprises inner and outer shell-like members 14 and 13 it might also be considered to comprise essentially the inner member 14, with the outer member 13 cooperating therewith to define a flow passage to the hopper.

The construction and mode of operation of the valve assembly 21 forms no part of the present invention. For purposes of illustration, however, such assembly is here indicated as comprising a slide type valve 29 having a circumferential slot 31 and adjusted in an axial sense by a thermally responsive bellows 32 in the path of oil returning to the engine. In the operation of the system as equipped with the illustrative valve assembly, when the oil is cold flow is to the hopper by way of pipe 17. A warming influence on the element 32 opens the pipe 19 to flow and ultimately closes the pipe 17. It is not intended that the disclosed valve should in any way be limitative on the instant tank structure which it is considered has an identity apart from any valve or valves which might be used in connection therewith.

What is claimed is:

1. A storage tank for use in an engine lubricant circulating system, including an outer tank shell holding the main body of stored lubricant, a hopper in said tank shell spaced from side walls of said shell through which a part of the lubricant in the system may be circulated in segregated relation to the main body thereof, separate inlet openings in said tank for flow to the interior of the tank and to said hopper, and conduit means extending from one of said inlet openings to said hopper, including an annulus in surrounding relation to said hopper over substantially the full length thereof.

2. A storage tank for use in an engine lubricant circulating system including an outer tank shell holding the main body of stored lubricant, a hopper in said tank shell through which a part of the lubricant in the system may be circulated in segregated relation to the main body thereof, said hopper including an inner shell communicating at its one end with an outlet aperture in said tank shell, the opposite end of said inner shell being open above the normal liquid level of the tank, and said hopper further including an outer shell in surrounding spaced apart relation to the said inner shell, and inlet means to the space between said shells relatively remote with respect to the said opposites end of said inner shell.

3. In a storage tank of an engine lubrication system, a hopper including an inner shell arranged to receive the circulating lubricant at its one end, the lubricant flowing through said inner shell and discharging therefrom at its opposite end, and an outer shell in surrounding spaced apart relation to said inner shell, there being an inlet aperture in said outer shell for flow into the space between said shells, said inlet aperture being remote from said one end of the inner shell, the incoming circulating lubricant flowing through the space between said shells toward the opposite end of said outer shell where it discharges into the said one end of said inner shell.

4. In a storage tank of an engine lubrication system, a hopper receiving the circulating liquid in its open upper end and discharging it through the lower end thereof, and means defining an inlet passage to the open upper end of said hopper and originating adjacent the lower end thereof, said passage including a circumferential wall in adjacent spaced relation to said hopper.

5. A storage tank for use in an engine lubricant circulating system, including a tank shell holding the main body of lubricant, an open ended hopper upright in said tank shell, the lower end thereof communicating with an outlet opening in the bottom of the tank shell and the upper end terminating within the tank shell above the normal lubricant level therein, and a flow pass to the upper end of said hopper originating adjacent to the lower end of said hopper and extending as an annulus in surrounding relation to the hopper for conducting the lubricant in contacting relation to said hopper and in indirect heat exchange relation to the main body of lubricant in the tank.

6. A storage tank according to claim 5, characterized by an external wall in spaced apart surrounding relation to said hopper defining said flow pass, the space between said wall and hopper being supplied with lubricant by an inlet opening in the bottom of said tank shell.

7. In a storage tank of an engine lubrication system, a hopper receiving the circulating lubricant in one end and discharging it through the opposite end, substantially in segregated relation to the main body of stored lubricant, and an inlet passage outside said hopper to said one end of the hopper conducting the incoming lubricant as a relatively thin high velocity film in heat exchange relation to the main body of stored lubricant.

8. A storage tank according to claim 7, characterized in that said inlet passage is constructed as an annulus in surrounding relation to said hopper and approximately coextensive therewith, the incoming lubricant entering said inlet passage adjacent to the said opposite end of said hopper and flowing longitudinally of the hopper to the said one end thereof.

9. In a storage tank of an engine lubrication system, a hopper adapted to be vertically positioned in said tank to provide a flow path for heated oil in heat exchange relation with a main body of oil in said tank, said hopper including closely spaced concentric inner and outer shells defining an annular path for flow of oil therebetween and being in interior communication with one another at their upper ends, each of said shells having a tapered bottom and said tapered bottoms of said inner and outer shells being nested to define a shallow space at the bottom of said hopper communicating at its upper periphery with said annular path, the bottom of said outer shell being provided with an inlet connection communicating with said shallow space and the bottom of said inner shell being provided with a discharge connection communicating with the interior of said inner shell and extending through said shallow space and the bottom of said outer shell to the exterior of said hopper.

10. In a storage tank of an engine lubrication system, a hopper adapted to be vertically positioned in said tank to provide a flow path for heated oil in heat exchange relation with a main body of oil in said tank, said hopper including closely spaced concentric cylindrical inner and outer shells defining an annular path for flow of oil therebetween and being in interior communication with one another at their upper ends, each of said shells having a conical bottom and said conical bottoms of said inner and outer shells being nested to define a shallow generally conical space at the bottom of said hopper communicating at its upper periphery with said annular path, the conical bottom of said outer shell being provided with an inlet connection communicating with said shallow space and the conical bottom of said inner shell being provided with a discharge connection communicating with the interior of said inner shell and extending through said shallow space and the bottom of said outer shell to the exterior of said hopper.

11. A hopper according to claim 10 and wherein said discharge connection is aligned with the axis of said inner and outer cylindrical shell and said inlet connection is laterally spaced from said axis.

12. In a storage tank of an engine lubrication system, a hopper adapted to be vertically positioned in said tank to provide a flow path for heated oil in heat exchange relation with a main body of oil in said tank, said hopper comprising closely spaced nested inner and outer shells defining a narrow path for flow of oil therebetween, said outer shell being provided near its bottom with an inlet connection communicating with said narrow path and said inner shell being provided near its bottom with a discharge connection extending through said outer shell to the exterior of said hopper, the upper end of said outer shell terminating at a point above said inner shell, whereby oil flowing through said inlet connection and said narrow path can flow over the upper periphery of said inner shell into the interior of said inner shell.

References Cited in the file of this patent

UNITED STATES PATENTS

| | | |
|---|---|---|
| 308,197 | Rober | Nov. 18, 1884 |
| 2,215,729 | Ruttimann | Sept. 24, 1940 |
| 2,435,359 | Landis | Feb. 3, 1948 |
| 2,584,877 | Hoffman et al. | Feb. 5, 1952 |
| 2,586,671 | Landis | Feb. 19, 1952 |

FOREIGN PATENTS

| | | |
|---|---|---|
| 7,519 | Great Britain | Mar. 31, 1903 |